US009332046B2

(12) United States Patent
Chan et al.

(10) Patent No.: US 9,332,046 B2
(45) Date of Patent: May 3, 2016

(54) RATE-ADAPTED DELIVERY OF VIRTUAL DESKTOP IMAGE ELEMENTS BY AN EDGE SERVER IN A COMPUTER NETWORK ENVIRONMENT

(71) Applicant: Cisco Technology, Inc., San Jose, CA (US)

(72) Inventors: Douglas Chan, San Jose, CA (US); Jiang Zhu, Sunnyvale, CA (US); Hao Hu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 14/056,051

(22) Filed: Oct. 17, 2013

(65) Prior Publication Data

US 2015/0113157 A1    Apr. 23, 2015

(51) Int. Cl.
   *H04L 29/06* (2006.01)
   *H04N 21/442* (2011.01)
   *H04N 21/2343* (2011.01)
   *H04N 21/845* (2011.01)
   *H04N 21/00* (2011.01)

(52) U.S. Cl.
   CPC ............ *H04L 65/60* (2013.01); *H04L 65/1083* (2013.01); *H04L 65/4084* (2013.01); *H04L 65/4092* (2013.01); *H04L 65/607* (2013.01); *H04L 67/38* (2013.01); *H04N 21/00* (2013.01); *H04N 21/23439* (2013.01); *H04N 21/44209* (2013.01); *H04N 21/8456* (2013.01)

(58) Field of Classification Search
   CPC . H04L 65/60; H04L 65/4084; H04L 65/4092; H04L 65/607; H04N 21/00; H04N 21/23439; H04N 21/8456; H04N 21/44209
   See application file for complete search history.

(56) References Cited

U.S. PATENT DOCUMENTS

| | | | |
|---|---|---|---|
| 6,226,642 B1 | 5/2001 | Beranek et al. | |
| 7,568,056 B2 | 7/2009 | Danilak | |
| 7,899,864 B2 | 3/2011 | Margulis | |
| 8,352,875 B2 | 1/2013 | Peltz et al. | |
| 8,374,113 B2 | 2/2013 | Meier et al. | |
| 2002/0103928 A1* | 8/2002 | Singal et al. | 709/238 |
| 2003/0051070 A1 | 3/2003 | Shappir et al. | |

(Continued)

OTHER PUBLICATIONS

Kerner, Sean Michael, "Riverbed Accelerates UDP with RiOS 7," Dec. 5, 2011, 1 page.

(Continued)

*Primary Examiner* — Chirag R Patel
(74) *Attorney, Agent, or Firm* — Edell, Shapiro & Finnan, LLC

(57) ABSTRACT

An edge server communicates with a client in a local network. The client displays a remote desktop image representative of a virtual desk image generated by a virtual desktop server (VDS). The edge server receives from the VDS a desktop image to be displayed on the remote desktop. The desktop image includes an incomplete window in which graphic media, such as video, is to be displayed. The edge server determines communication link conditions in the local network and a corresponding transmit data rate at which to transmit data to the client device and a suitable encoding rate at which the graphic media is encoded. The edge server downloads the graphic media from the content server, merges the downloaded graphic media into the incomplete area to produce a completed desktop image, and transmits the completed desktop image at the determined transmit data rate for display on the remote desktop.

23 Claims, 7 Drawing Sheets

(56) References Cited

U.S. PATENT DOCUMENTS

| | | |
|---|---|---|
| 2003/0108035 A1* | 6/2003 | Langberg et al. ............. 370/352 |
| 2006/0005187 A1 | 1/2006 | Neil |
| 2006/0104259 A1 | 5/2006 | Caballero-McCann et al. |
| 2006/0187340 A1* | 8/2006 | Hsu ............................... 348/441 |
| 2006/0230105 A1 | 10/2006 | Shappir et al. |
| 2006/0230156 A1 | 10/2006 | Shappir et al. |
| 2006/0230438 A1 | 10/2006 | Shappir et al. |
| 2007/0018992 A1 | 1/2007 | Wong |
| 2007/0116246 A1 | 5/2007 | Walker et al. |
| 2009/0021583 A1 | 1/2009 | Salgar et al. |
| 2010/0094966 A1* | 4/2010 | Zuckerman et al. .......... 709/219 |
| 2010/0138744 A1 | 6/2010 | Kamay et al. |
| 2010/0146504 A1 | 6/2010 | Tang |
| 2011/0126110 A1 | 5/2011 | Vilke et al. |
| 2012/0054744 A1 | 3/2012 | Singh et al. |
| 2012/0084774 A1 | 4/2012 | Post et al. |
| 2012/0110131 A1 | 5/2012 | Villagas Nunez et al. |
| 2012/0151373 A1* | 6/2012 | Kominac et al. .............. 715/740 |
| 2012/0226998 A1 | 9/2012 | Friedl et al. |
| 2012/0246554 A1 | 9/2012 | Shappir |
| 2012/0254456 A1* | 10/2012 | Visharam et al. ............. 709/231 |
| 2012/0331127 A1 | 12/2012 | Wang et al. |
| 2013/0013664 A1 | 1/2013 | Baird et al. |
| 2013/0024906 A9 | 1/2013 | Carney et al. |
| 2013/0094439 A1* | 4/2013 | Moshfeghi ..................... 370/328 |
| 2014/0095593 A1* | 4/2014 | Wei ................................ 709/203 |
| 2014/0122566 A1* | 5/2014 | Spracklen et al. ............ 709/203 |

OTHER PUBLICATIONS

Cisco, "Cisco Unified Survivable Remote Site Telephone Version 4.1," Data Sheet, Oct. 2008, pp. 1-10.
HDX™ Technologies, http://hdx.citrix.com/hdx-overview, May 11, 2011, 2 pages.
Wyse, "Wyse Thin Computing Software, Delivering the best experience over virtualized desktop environments, Summary Data," 2010, 9 pages.
Greenberg, et al., "Adaptive Offloading for Pervasive Computing," IEEE Pervasive Computing, vol. 3, No. 3, Jul.-Sep. 2004, pp. 66-73.
Interdigital, "Video-Aware Link Adaption," White Paper, www.interdigital.com, Oct. 2012, pp. 1-8.
Ericom, "Ericom Blaze, A Breakthrough in RDP Acceleration and Compression," http://www.ericom.com/specs/Ericom_Blaze.pdf, retrieved Oct. 2013, 2 pages.

* cited by examiner

RATE-ADAPTED DELIVERY OF VIRTUAL DESKTOP IMAGE ELEMENTS BY AN EDGE SERVER IN A COMPUTER NETWORK ENVIRONMENT

TECHNICAL FIELD

The present disclosure relates to virtual desktop sessions operating in a networked computer environment.

BACKGROUND

During a virtual desktop session operating over multiple networks, a virtual desktop hosted on a virtual desktop server connected to a wide area network may construct data associated with graphics-centric applications, such as a web page to be displayed ultimately on a remote desktop hosted on a client device connected to a local network. The web page may be a composite image of both rasterized graphic media, such as video, and relatively simple media, such as text, window borders, and the like.

There are challenges in virtual desktop systems to handle the communication of remote desktop data that contains streaming application content, such as video, audio, etc.

DESCRIPTION OF EXAMPLE EMBODIMENTS

Overview

Techniques are presented in which an edge server is configured to communicate with a client device in a local network and the client device is configured to execute a remote desktop application to display a desktop image representative of a virtual desktop hosted by a virtual desktop server. The edge server receives from the virtual desktop server the desktop image to be processed for display by the remote desktop application. The desktop image includes an incomplete area in which graphic media is to be displayed. The edge server determines communication link conditions in the local network and determines a transmit data rate for transmitting data to the client device over the local network based on the determined link conditions. The edge server downloads the graphic media from the content server and uses the downloaded graphic media to complete the incomplete area, to produce a completed desktop image. The edge server transmits the completed desktop image to the client device at the determined transmit data rate for display on the remote desktop.

EXAMPLE EMBODIMENTS

Figure 1:
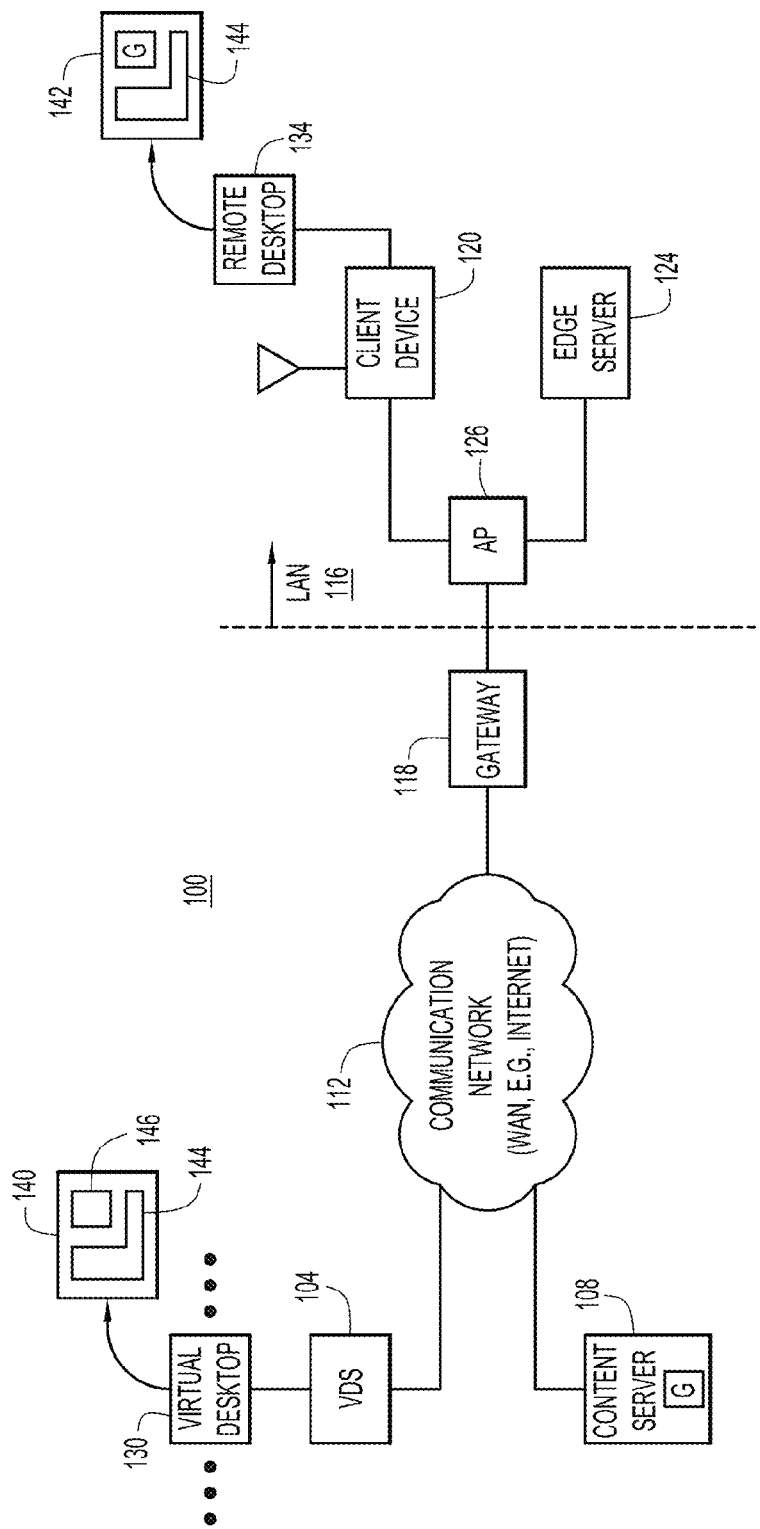
FIG. 1 is a block diagram of an example virtual desktop infrastructure (VDI) environment that supports rate-adapted delivery of virtual desktop media by an edge server during a virtual desktop session according to techniques presented herein.

Referring first to FIG. 1, there is shown a block diagram of a virtual desktop infrastructure (VDI) environment 100 that supports rate-adapted delivery of virtual desktop media by an edge server during a virtual desktop session according to techniques provided herein. VDI environment 100 includes a virtual desktop server (VDS) 104 and a content server (CS) 108 each connected to a communication network 112, which includes one or more wide area networks (WANs), such as the Internet. VDI environment 100 also includes a local area network (LAN) 116, such as, e.g., a wireless LAN (WLAN), connected to communication network 112 through a gateway switch 118. LAN 116 may operate in accordance with any number of network standards including, but not limited to, the Institute of Electrical and Electronic Engineers (IEEE) 802.11 series of standards. LAN 116 includes a client device (CD) 120 and an edge server (ES) 124 each configured to communicate with one another and communication network 112 via an access point (AP) 126 of the LAN, such as a wireless router. Edge server 124 may be connected directly to LAN 116. VDI environment 100 may include additional virtual desktop servers, content servers, and client devices, not shown. VDI environment 100 may be referred to as a Fog computing environment in which edge server 124 operates at the edge of networks 116 and 112 and uniquely has access to information regarding both networks that is leveraged in techniques provided herein.

VDS 104 hosts virtual or cloud-based applications and a virtual desktop graphically depicted at reference numeral 130 to generate images related to the virtual applications. Client device 120 hosts a remote desktop 134 through which a user may invoke and control the aforementioned virtual applications hosted on VDS 104. Remote desktop 134 (hosted on client device 120) and virtual desktop 130 (hosted on VDS 104) represent peer applications that exchange image/display information and related commands during a virtual desktop session so that images generated by virtual desktop 130 on behalf of client device 120 may be displayed on remote desktop 134. A display protocol, several of which are known in the art, may be used to communicate the image/display information and related commands between virtual desktop 130 and remote desktop 134. For example, the display protocol may transport user interactions with peripherals such as keyboard keystrokes and mouse events at client device 120 to virtual desktop 130 and limited, relatively static image content from the virtual desktop to the remote desktop.

Content server 108 stores graphic media such as multimedia video and/or pictures (i.e., still images, such as photographs) that may be requested for display at client device 120 via remote desktop 134. The graphic media may be stored in content server 108 at locations identified by network addresses or Uniform Resource Locators (URLs). In an example, content server 108 may include file repositories filled with personal videos and pictures, or publicly available videos. The graphic media may be stored in an encoded form. For example, graphic media in the form of video may be encoded at different encoding rates in accordance with any number of encoding standards including, but not limited to, the Moving Picture Experts Group (MPEG) standards, the H.264 standard, and so on. Pictures may be encoded according to any number of standards including, but not limited to, the Joint Photographic Experts Group (JPEG) standards. In the example of FIG. 1, content server 108 stores graphic media G, such as a multimedia video. Multimedia video includes video media, and may also include one or more of audio media, text media, and metadata.

In an embodiment of a virtual desktop session that does not include edge server 124, virtual desktop 130 may generate a virtual web page that includes graphic media, such as video, to be displayed by remote desktop 134. In this embodiment, VDS 104 downloads the video from the Internet, e.g., over network 112, at a relatively high transmit data rate supported by the Internet, renders the downloaded video, and combines the rendered video with relatively simple media to form the web page as a composite of the different media. Then, VDS 104 sends the virtual web page, including the composite video and simple media, to client device 120 over LAN 116 to be displayed by remote desktop 134. A frame update/refresh rate and possibly an encoding rate associated with the video as accessed from the Internet may substantially exceed a transmit data rate that can be supported by LAN 116. As a result, the video may be rendered at client device 120 in disjoint segments or "chunks" and displayed by remote desktop 134 as choppy, discontinuous video.

In another embodiment including edge server 124, techniques are provided to overcome the above-mentioned disadvantage. According to the techniques provided herein, edge server 124 intervenes in an established virtual desktop session to achieve rate-adapted delivery of graphic media associated with virtual desktop images to client device 120. Using rate-adapted delivery as described herein, edge server 124 delivers one or more graphic media elements related to virtual desktop 130 to remote desktop 134: (i) at an encoding rate at which the one or more graphic media elements are encoded (also referred to simply as the "encoding rate of the graphic media") and that is suitable for communication link conditions in LAN 116, i.e., at an encoding rate of the graphic media that is adapted to a transmit data rate that is matched or suited to the link conditions; and (ii) in a manner that offloads, from the remote desktop, portions of graphic media processing related to the graphic media.

To ensure the one or more graphic media elements (referred to herein simply as "graphic media") are delivered at the suitable encoding rate of the graphic media and transmit data rate, edge server 124 repeatedly monitors/determines the communication link conditions in LAN 116 during the virtual desktop session. The determined link conditions are indicative of an available communication bandwidth and thus the suitable transmit data rate for transmitting the graphic media associated with virtual desktop 130 to client device 120 over LAN 116. Edge server 124 may determine one or more of the following communication link conditions: a maximum physical transmit data rate provided in LAN 116, e.g., 54 Megabits-per-second (Mbps) for an 802.11a wireless network; and a signal-to-noise (SNR) level in LAN 116. For example, edge server 124 may periodically request information from AP 126 indicating SNRs between AP 126 and client device 120 and between AP 126 and edge server 124. Based on the determined communication link conditions, edge server 124 may determine as the suitable transmit data rate a maximum transmit data rate that can be sustained by LAN 116 to transmit graphic media to client device 120 with a highest quality.

An example virtual desktop scenario is now described with reference to FIG. 1, in which virtual desktop 130, acting on behalf of client device 120, has generated an image of a web page 140 to be displayed ultimately as a web page 142 on remote desktop 134. As is known, a web page may include image elements of both non-graphic media and graphic media. Non-graphic media may include relatively static image information, such as text, symbols, and simple geometrical constructs, such as, e.g., windows (borders), patterns, designs, colorations, and the like. In contrast, graphic media may include relatively non-static image information such as rasterized media, e.g., multimedia video, which tends to change on a video-frame-to-video-frame basis at a video frame rate. Graphic media may also include graphic intensive images, such as, but not limited to, photographic images.

In the example virtual desktop scenario of FIG. 1, web page 140 includes elements of both non-graphic media and graphic media. The graphic media is represented as graphic media G stored in content server 108. Typically, graphic media G is stored in content server in an encoded form, i.e., graphic media G stored in content server 108 includes encoded graphic media content. The virtual desktop application 130 of the VDS 104 renders the non-graphic media and populates web page 140 with the rendered non-graphic media at non-graphic areas or portions 144 of the web page 140. In contrast, virtual desktop application 130 does not populate web page 140 with graphic media G or the rendered version thereof. Instead, virtual desktop 130 generates an incomplete area or empty window 146 at a position in web page 140 where graphic media G is expected to be displayed. Empty window 146 serves as a positional place holder for graphic media G in web page 140. Web page 140 is considered an incomplete web page because of missing media graphic G.

Edge server 124 operates to supply the missing graphic G in a rate-adaptive manner, as is now described. Virtual desktop 130 transmits incomplete web page 140 and the URL of missing graphic media G over WAN 112 and LAN 116 to edge server 124. The URL may be embedded in web page 140, e.g., in association with incomplete window 146. Edge server 124 determines the communication link conditions in LAN 116 and, correspondingly, a suitable transmit data rate for transmitting graphic media G from the edge server to client device 124 over the LAN, given the determined link conditions. Edge server 124 may solicit communication link condition information from AP 126 and/or autonomously determine the link conditions. In an example in which the determined communication link conditions include an available communication bandwidth in LAN 116, the suitable transmit data rate may be a maximum transmit data rate equal to or less than the available communication bandwidth, and the transmit data rate is also preferably matched to an encoding rate of the graphic media. In an example in which the determined link conditions include an SNR in LAN 116, the suitable transmit data rate may be a maximum transmit data rate that can be sustained at that SNR with an acceptable data error rate. A table of "SNR vs. suitable transmit data rate" may be stored in a memory of edge server 124 and may be used to determine the suitable data rate based on the determined link conditions.

Returning again to the example virtual desktop scenario of FIG. 1, using the URL, edge server 124 accesses and downloads graphic media G from content server 108. If graphic media G is stored in an encoded form in content server 108, then after edge server 124 downloads the graphic media, the edge server may (i) decode the graphic media, (ii) not decode the graphic media, or (iii) transcode the graphic media. Edge server 124 merges downloaded graphic media G (in an encoded form, a decoded form (in which case edge server 124 renders the decoded graphic media into a displayable form), or a transcoded form as described below) into window 146 of web page 140 to complete the web page. Edge server 124 transmits the completed web page to client device 120 over LAN 116 at the encoding rate of the graphic media that is matched to the suitable transmit data rate. Client device 120 displays the completed web page, including merged graphic media G, shown at 142 on remote desktop 134. In one embodiment, edge server 124 may cache downloaded media graphic G for access at a later time after the current virtual desktop session has been terminated. For example, another client device operating a remote desktop may require media graphic G, in which case edge server 124 may transmit the cached media graphic to that client device at a new suitable encoding rate based on current determined communication link conditions.

Figure 2:
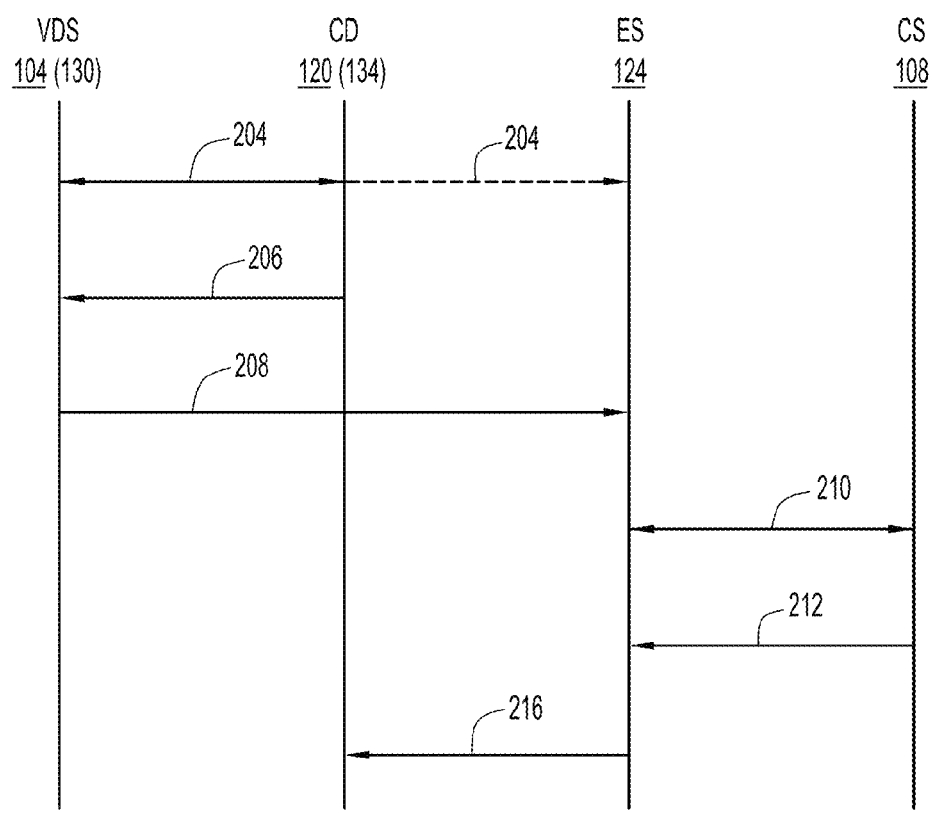
FIG. 2 depicts an example message sequence diagram in a virtual desktop session in the VDI environment of FIG. 1.

With reference now to FIG. 2, a message sequence diagram 200 in connection with a virtual desktop session in VDI environment 100 is now described. Reference is also made to FIG. 1 for the description of the message sequence diagram 200 shown in FIG. 2.

At 204, VDS 104 and client device 120 exchange messages to establish the virtual desktop session between virtual desktop 130 and remote desktop 134. Also, VDS 104 informs edge server 124 of the virtual desktop session and an identity, e.g., network address, of client device 120. Once the virtual desktop session is established, virtual desktop 130 generates images of web pages, e.g., web page 140 including non-graphic media, to be displayed on remote desktop 134. Also, edge server 124 repeatedly determines communication link conditions indicative of suitable transmit data rates in LAN 116 with respect to client device 120.

At 206, remote desktop 134 sends a request to VDS 104 for graphic media G associated with virtual desktop web page 140. Alternatively, the request may originate from the virtual applications hosted on VDS 104. Either way, the request includes a URL or other locator to identify graphic media G. In response to the request for graphic media G, virtual desktop 134 generates incomplete window 146 in virtual web page 140.

At 208, VDS 104 sends incomplete web page 140 to edge server 124 along with the URL or other locator that identifies requested graphic media G.

At 210, edge server 124 requests/accesses graphic media G from content server 108 using the URL or other locator. Graphic media G may include multimedia video stored in content server 108 as multiple video streams each encoded at a distinct encoding rate. In that case, at 210, edge server 124 may negotiate to select and download (i.e., access) the multimedia video stream having an encoding rate best suited to the situation. For example, edge server 124 may select the encoded video stream that has a maximum encoding rate among the stored encoded video streams that can be downloaded from content server 108 given a prevailing communication bandwidth in WAN 112. In another example, edge server 124 may select the encoded video stream that has an encoding rate less than or equal to a maximum transmit data rate that LAN 116 can support, as indicated based on currently determined communication link conditions in the LAN.

At 212, edge server 124 downloads graphic media G. Edge server 124 merges downloaded graphic media G (possibly encoded, decoded, or transcoded depending on a given embodiment) into web page 140 at window 146 to complete web page 140. In other words, edge server 124 populates window 146 with downloaded graphic media G.

At 216, edge server 124 transmits the completed web page 140, along with merged graphic G), to client device 120 at a transmit data rate determined based on the currently determined communication link conditions in LAN 116 for display on remote desktop 134 as web page 142. The encoding rate of the downloaded graphic media is preferably matched to, i.e., suitable with, the determined transmit data rate.

Figure 3:
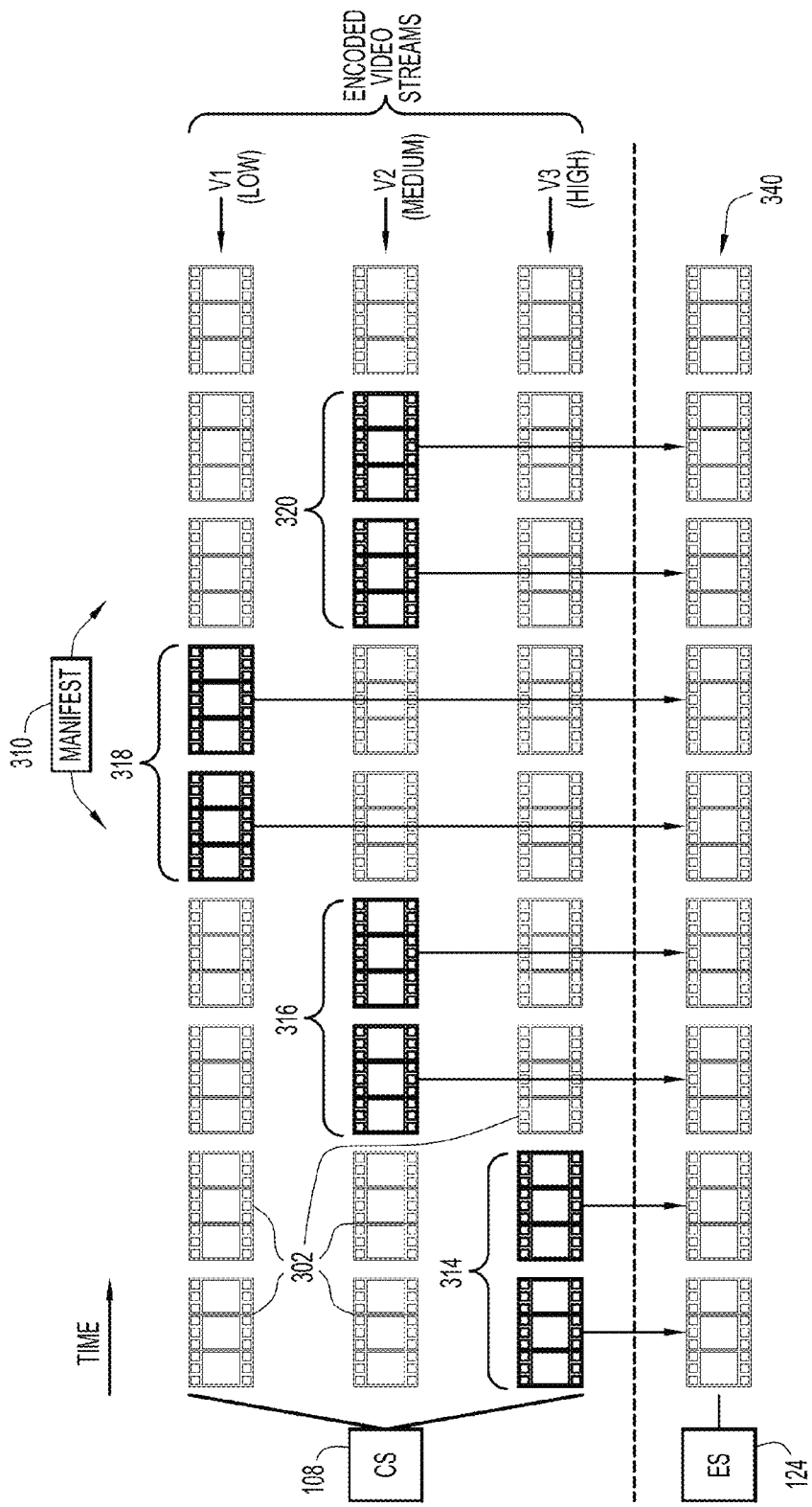
FIG. 3 illustrates an example of rate-adaptive streaming of graphic media in the form of encoded multimedia video from a content server to an edge server in support of rate-adapted delivery of the video to a client device.

FIG. 3 is an illustrative example of rate-adaptive streaming of graphic media G in the form of encoded multimedia video from content server 108 to edge server 124 in support of rate-adapted delivery of the video to client device 120. In the example, graphic media G includes multimedia video from a content provider that has been encoded and stored on content server 108 as multiple encoded video streams V1, V2, and V3 respectively encoded at low, medium, and high relative encoding rates (also referred to as "encoding bit rates"). Each of the encoded video streams V1, V2, and V3 may be in the form of encoded video container files. Each encoding rate is based on a corresponding distinct set of factors including, but not necessarily limited to, a frame rate of the video, a video resolution (e.g., pixel density) indicative of a video quality, and an SNR of the video content in each of the video frames. Example low, medium, and high encoding rates are 1,000 Kilo-bits-per-second (Kbps), 8,000, Kbps, and 15,000 Kbps, respectively.

Each of video streams V1-V3 includes a time ordered sequence of encoded video segments 302 (arranged horizontally in a direction of increasing time in FIG. 3) of a finite duration, e.g., two to five seconds. Each of segments 302 encodes a number of video frames depending on a video frame rate (e.g., 30 frames-per-second) and the finite duration of the video segment. A manifest or index 310 associated encoded video streams V1-V3 may also be stored in content server 108. Manifest 310 may identify (i) the locations where encoded video streams V1-V3 in content server 108, and (ii) the respective encoding rates of the encoded video streams as identified in the manifest.

During a desktop session it is assumed that edge server 124 (i) repeatedly determines a transmit data rate at which to transmit data to client device 120 over LAN 116 based on monitored communication link conditions in the LAN, (ii) downloads encoded video having a suitable encoding rate from content server 108 (as described below), (iii) uses (e.g., merges) the downloaded video (in either an encoded, or alternatively, decoded form) to complete a web page, and (iv) transmits the completed web page to the client device at the determined transmit data rate.

In one embodiment, edge server 124 downloads graphic media G from content server 108 as encoded video segments 302 from selected ones of video streams V1, V2, and V3 having corresponding low, medium, and high encoding rates based on the determined transmit data rate. For example, at any given time, edge server 124 selects the one of encoded video streams V1, V2, V3 (from which to download encoded video segments) having a maximum encoding rate among the encoded video streams that is less than or equal to the determined transmit data rate, and then downloads encoded segments from that encoded video stream. Using the downloaded encoded segments, edge server 124 generates a complete web page as described above, and then transmits the completed web page to client device 124 at the determined transmit data rate.

In the above described embodiment, initially, edge server 124 selects for download encoded video stream V3 having the highest encoding rate, based on the determined transmit data rate, and then downloads two encoded segments 314 from that encoded video stream. As determined link conditions in LAN 116 worsen over time and the determined transmit data rate correspondingly decreases, edge server 124 selects encoded video stream V2 having the medium encoding rate, and then downloads two encoded segments 316 from that encoded video stream. As the determined link conditions worsen and the corresponding determined transmit data rate decrease even further, edge server 124 selects encoded video stream V1 having the low encoding rate, and then downloads two encoded segments 318 from that stream. As the determined link conditions begin to improve and the determined transmit data rate correspondingly increases, edge server 124 selects encoded video stream V2 having the medium encoding rate, and then downloads two encoded segments 320 from that stream.

Edge server 124 continues the process to download rate-appropriate encoded segments over time. As a result, edge server downloads/receives a sequence or stream of contiguous encoded video segments identified at 340 that have corresponding encoding rates that may vary over time, so as to be rate-appropriate for the determined link conditions and associated determined transmit data rate in LAN 116. This is an example of rate-adapted delivery of the media graphic (G) that is an image element of virtual desktop 130.

In another embodiment, the video encoding rate selected (by edge server 124) for download from content server 108 is not tied to the determined transmit data rate in LAN 116. Instead, edge server 124 selects for download the encoded video stream having a maximum encoding rate that a prevailing bandwidth of WAN 112 will allow. For example, edge server selects for download the video stream having an encoding rate that is less than or equal to a transmit data rate supported by WAN 112 and at which the encoded video stream can be downloaded from content server 108 to edge server 124. If the encoding rate of the downloaded encoded video stream is greater than the determined transmit data rate in LAN 116, then edge server 124 may transcode the downloaded encoded video from the encoding rate at which the encoded video was initially encoded (as stored in content server 108) to a new encoding rate that is less than or equal to the determined transmit data rate at which the completed web page is to be transmitted to client device 120.

Figure 4:
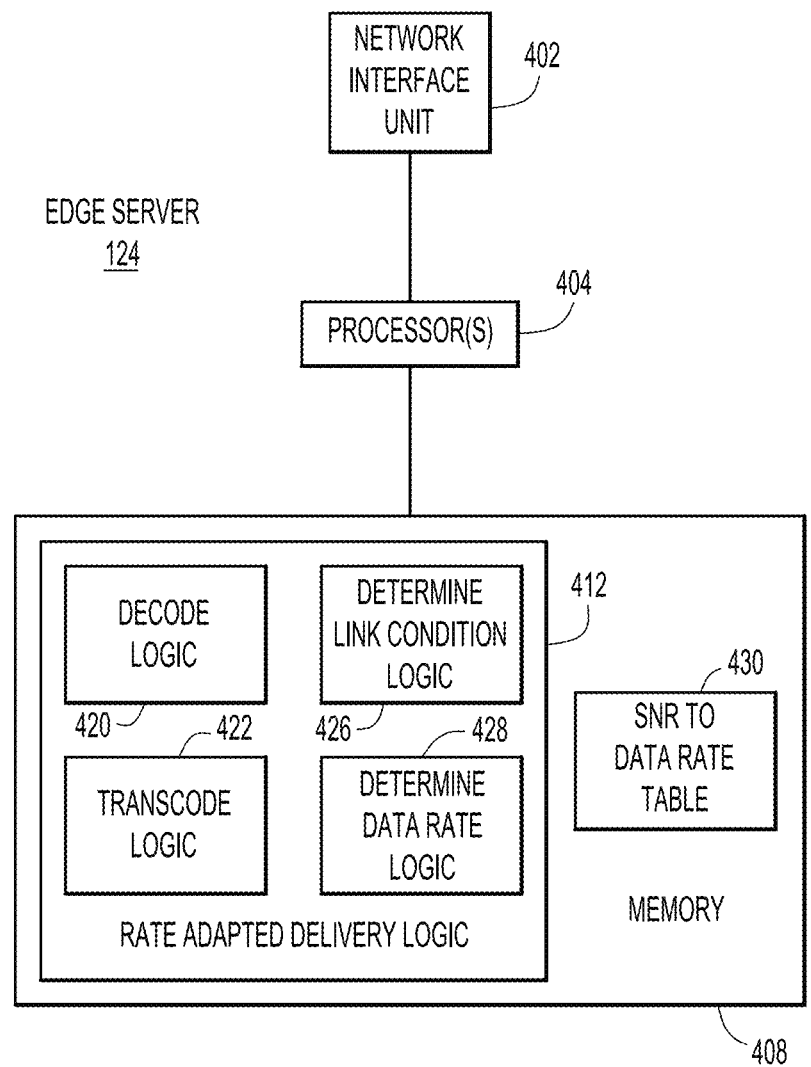
FIG. 4 is a block diagram of an example edge server configured to perform rate-adapted delivery of graphic media in connection with virtual desktop sessions.

Reference is now made to FIG. 4, which shows an example block diagram of edge server 124 configured to perform rate-adapted delivery of graphic media in connection with virtual desktop sessions as described herein. There are numerous possible configurations for edge server 124 and FIG. 4 is meant to be an example. Edge server 124 includes a network interface unit 402, a processor 404 (which may include multiple processors), and memory 408. The network interface (I/F) unit 402 is, for example, an Ethernet card device that allows edge controller 124 to connect to a wired (Ethernet) network. Network I/F 402 may also include wireless connection capability to connect with a wireless network. Network I/F 402 is configured to detect communication link conditions in LAN 116. The network I/F 402 may include a plurality of ports to which it can connect to the various devices in LAN 116. The processor 404 is a microcontroller or microprocessor, for example, configured to execute software instructions stored in the memory 408.

The memory 408 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 408 may comprise one or more computer readable storage media (e.g., a memory device) encoded with software comprising computer executable instructions and when the software is executed (by the processor 404) it is operable to perform the operations described herein. For example, the memory 408 stores or is encoded with instructions for Rate-Adapted Delivery logic 412 to perform operations to implement the rate-adapted techniques described herein. Rate-Adapted Delivery logic 412 includes the following logic modules to support the rate-adapted techniques described herein: Decode logic 420 to decode downloaded graphic media that is in encoded form; Transcode logic 422 to transcode downloaded encoded graphic media; Determine Link Condition logic 426 to monitor and determine communication link conditions in LAN 116; and Determine Data Rate logic 428 to determine a transmit data rate based on determined link conditions. In addition, the memory 408 stores downloaded graphic media and a table 430 to translate SNRs to transmit data rates.

Figure 5:
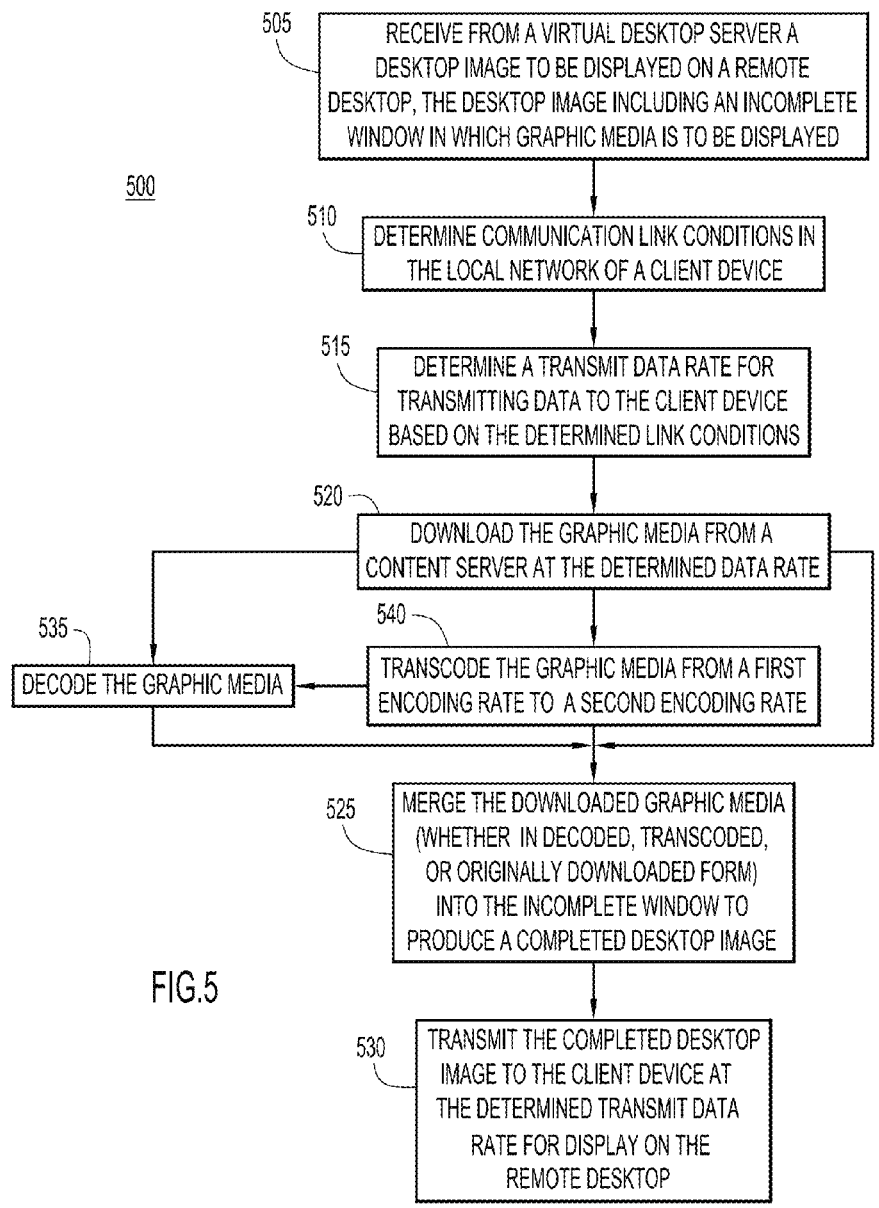
FIG. 5 is a flow chart of an example method detailing operations performed by the edge server to implement rate-adaptive techniques in connection with a virtual desktop session.

Reference is now made to FIG. 5, which shows a flow chart for operations of a method 500 performed by Rate-Adapted Delivery logic 412 in edge server 124 to implement rate-adaptive techniques in connection with a virtual desktop session as described above.

At 505, logic 412 receives from virtual desktop server 130 virtual desktop image 140 to be displayed on remote desktop 134. Virtual desktop image 140 includes an incomplete area or window 146, in which graphic media G, such as a video or a picture, is to be displayed.

At 510, logic 412 determines communication link conditions in LAN 116, such as an available communication bandwidth and/or an SNR indicative of a communication bandwidth. In an example, operation 510 determines wireless communication link conditions in LAN 116, such as conditions of a wireless communication link over which data is transmitted to client device 120.

At 515, logic 412 determines a transmit data rate for transmitting data to client device 120 over LAN 116 based on the determined link conditions. The determined transmit data rate may be a maximum transmit data rate that LAN 116 can support under the determined communication link conditions (e.g., SNR, and/or available bandwidth).

At 520, logic 412 downloads graphic media G from content server 108. Graphic media G downloaded from content server 108 is typically in encoded form, i.e., includes encoded graphic media content.

In one example, flow proceeds from 520 to 525, where logic 412 merges downloaded graphic media G in the form it was originally downloaded (e.g., in encoded form) into incomplete window 146 to produce a completed desktop image. In this example, merge operation 525 may also be referred to equivalently as any of "using the downloaded graphic media G to complete incomplete window 146," "completing incomplete window 146 using the downloaded graphic media," or "filling-in incomplete window 146 using the downloaded graphic media" in order to complete the desktop image.

At 530, logic 412 causes edge server 124 to transmit the completed window to client device 120 at the determined transmit data rate for display on remote desktop 142.

In another example, in which it is assumed that graphic media G downloaded from content server 108 is encoded, flow proceeds from 520 to a decode operation 535.

At 535, logic 412 decodes encoded graphic media G to recover the graphic media (in decoded form). Then, flow proceeds to merge operation 525, where logic 412 merges the decoded graphic media into incomplete window 146. In this example, edge server 124 offloads the decode operation from client device 124, which would otherwise have to perform the decode operation. In this example, decode operation 535 and subsequent merge operation 525 are collectively referred to equivalently as any of "using the downloaded graphic media G to complete incomplete window 146," "completing incomplete window 146 using the downloaded graphic media," or "filling-in incomplete window 146 using the downloaded graphic media" in order to complete the desktop image.

In still another example, in which it is assumed that graphic media G is encoded at a first encoding rate, flow proceeds from 520 to a transcode operation 540.

At 540, logic 412 transcodes (i.e., decodes and then re-encodes) encoded graphic media G from the first encoding rate to a second encoding rate (also referred to as a "transcoded rate"). The second encoding rate may be less than the first encoding rate. For example, at 540, logic 412 may compare the first encoding rate to the determined transmit data rate (from 515) and may then transcode the downloaded encoded graphic media G from the first encoding rate to a second encoding rate that is less than or equal to the determined data transmit rate (from 515) if the result of the compare indicates that the first encoding rate is greater than the determined transmit data rate. Alternatively, at 540, logic 412 may transcode the encoded graphic media G to second encoding rate that is greater than the first encoding rate. Then flow proceeds from 540 to merge operation 525, where logic 412 merges the transcoded graphic media into incomplete area 146. In an alternative embodiment, flow proceeds from transcode operation 540 to decode operation 535, where logic 412 decodes the transcoded graphic media to recover the graphic media.

Figure 6:
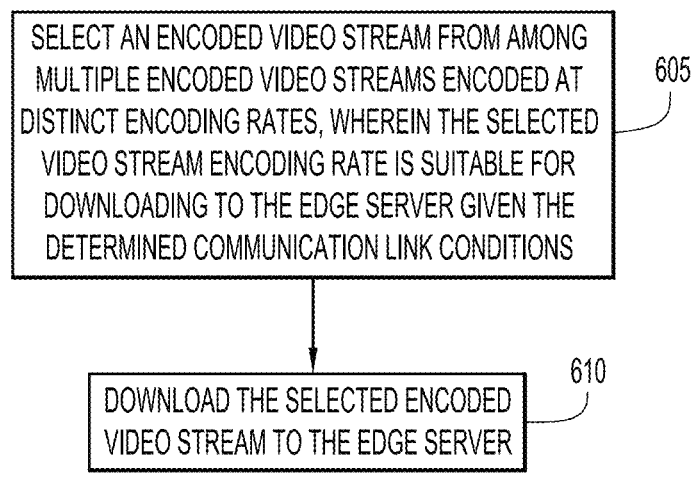
FIG. 6 is a flow chart that depicts operations performed by the edge server to stream multimedia video in connection with the virtual desktop session.

Reference is now made to FIG. 6, which shows operations 605 and 610, which are performed at operations 515 and 520 in FIG. 5, by Rate-Adapted Deliver logic 412 in edge server 124 to stream multimedia video (e.g., graphic media G is multimedia video) in connection with the virtual desktop session described above.

At 605, logic 412 selects an encoded multimedia video stream from among multiple encoded multimedia video streams (e.g., streams V1-V3) respectively encoded at distinct encoding rates that are stored on content server 108. In one embodiment, logic 412 selects an encoding rate based on the determined communication link conditions and associated determined transmit data rate for LAN 116 as described above, for example, in connection with the example of FIG. 3. The selected encoding rate is matched to the determined transmit data rate. For example, logic 412 selects a maximum available encoding rate that is less than or equal to the determined transmit data rate. In this embodiment, these operations are offloaded from client device 124, which would otherwise have to perform the operations.

At 610, logic 412 downloads encoded segments of the selected encoded video stream. The downloaded video is used to fill-in the incomplete web page to produce a complete web page, and then the completed web page is transmitted to client device 120 at the determined transmit data rate.

Logic 412 repeats operations 605 and 610 over time to perform rate-adaptive streaming of the video.

Figure 7:
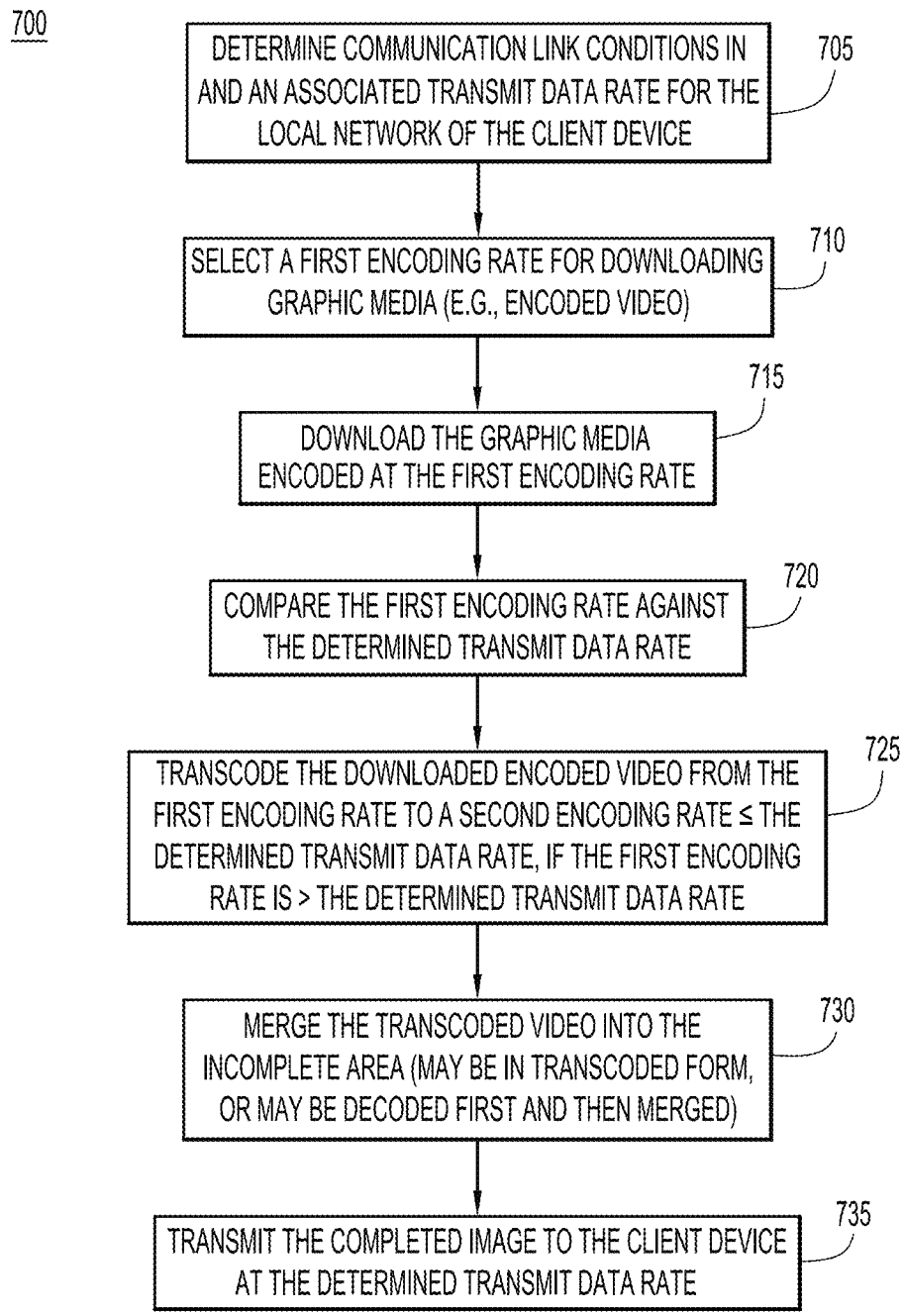
FIG. 7 is a flow chart that depicts operations performed by the edge server to transcode encoded video stored in the content server.

Turning to FIG. 7, there is shown a flow chart of operations performed by logic 412 in edge server 124 to transcode encoded video stored in content server 124.

At 705, logic 412 determines communication link conditions in and an associated transmit data rate for LAN 116.

At 710, logic 412 selects a first encoding rate for downloading encoded video from content server 108.

At 715, logic 412 downloads the graphic media that is encoded at the first encoding rate. That is, encoded video that is encoded at the selected first encoding rate is downloaded.

At 720, logic 412 compares the first encoding rate against the determined transmit data rate.

At 725, logic 412 transcodes the downloaded encoded video from the first encoding rate to a second encoding rate that is less than or equal to the determined transmit data rate, if the first encoding rate is greater than the determined transmit data rate.

At 730, logic 412 uses the transcoded video to fill-in the incomplete area to produce a completed web page. This may include merging the transcoded video into the incomplete area in transcoded (encoded) form, or it may be decoded first and then merged.

At 735, logic 412 transmits the completed image to the client device at the determined transmit data rate.

Over time, operations 720-735 are repeated so that, as the determined transmit data rate changes with the communication link conditions, the downloaded encoded video that is stored (i.e., cached) in edge server 124 may be transcoded from the first encoding rate to different encoding rates matched to corresponding ones of the determined transmit data rates and then processed for subsequent transmission to client device 120 as necessary.

As presented in the foregoing, techniques are provided in which an edge server intervenes in an established virtual desktop session to achieve rate-adapted delivery of graphic media associated with a virtual desktop image, such as a web page, to a client device connected to a local network. A virtual desktop server generates a web page from which the graphic media is missing, and sends the web page to the edge server to that the edge serve can complete the image. To this end, the edge server accesses the graphic media, merges the graphic media into a completed web page, and transmits the completed web page to the client device at the determined transmit data rate and encoding rate of the graphic media. As a result, the graphic media portion of the web page, e.g., video, is displayed at the client device in a seamless manner.

In summary, in one form, a method is provided comprising: at an edge server configured to communicate with a client device in a local network, the client device configured to execute a remote desktop application to display a desktop image representative of a virtual desktop hosted by a virtual desktop server: receiving from the virtual desktop server the desktop image to be processed for display by the remote desktop application, the desktop image including an incomplete area in which graphic media is to be displayed; determining communication link conditions in the local network; determining a transmit data rate for transmitting data to the client device over the local network based on the determined link conditions; downloading the graphic media from the content server; using the downloaded graphic media to complete the incomplete area to produce a completed desktop image; and transmitting the completed desktop image to the client device at the determined transmit data rate for display on the remote desktop.

Similarly, an apparatus is provided comprising: A apparatus comprising: a network interface unit configured to with a client device in a local network, the client device configured to execute a remote desktop application to display a desktop image representative of a virtual desktop hosted by a virtual desktop server; and a processor coupled to the network interface unit, and configured to: receive from the virtual desktop server the desktop image to be processed for display by the remote desktop application, the desktop image including an incomplete area in which graphic media is to be displayed; determine communication link conditions in the local network; determine a transmit data rate for transmitting data to the client device over the local network based on the determined link conditions; download the graphic media from the content server; use the downloaded graphic media to complete the incomplete area to produce a completed desktop image; and cause the network interface to transmit the completed desktop image to the client device at the determined transmit data rate for display on the remote desktop.

In still another form, provide herein is one or more computer readable storage media encoded with software comprising computer executable instructions operable to: at an edge server configured to communicate with a client device in a local network, the client device configured to execute a remote desktop application to display a desktop image representative of a virtual desktop hosted by a virtual desktop server, receive from the virtual desktop server the desktop image to be processed for display by the remote desktop application, the desktop image including an incomplete area in which graphic media is to be displayed; determine communication link conditions in the local network; determine a transmit data rate for transmitting data to the client device over the local network based on the determined link conditions; download the graphic media from the content server; use the downloaded graphic media to complete the incomplete area to produce a completed desktop image; and transmit the completed desktop image to the client device at the determined transmit data rate for display on the remote desktop.

Although the apparatus, method, and computer program product are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    at an edge server configured to communicate with a client device in a local network, the client device configured to execute a remote desktop application to display a desktop image representative of a virtual desktop hosted by a virtual desktop server:
        receiving from the virtual desktop server the desktop image to be processed for display by the remote desktop application, the desktop image including an incomplete area in which graphic media is to be displayed, wherein the graphic media includes video accessible from a content server as multiple encoded video streams each encoded at a distinct encoding rate;
        determining communication link conditions in the local network;
        determining a transmit data rate for transmitting data to the client device over the local network based on the determined link conditions;
        selecting, at the edge server, an encoded video stream among the multiple encoded video streams based on the distinct encoding rates and the determined transmit data rate;
        downloading the selected encoded video stream of the graphic media from the content server;
        transcoding the downloaded encoded video stream to a different encoding rate;
        using the transcoded video stream of the graphic media to complete the incomplete area to produce a completed desktop image; and
        transmitting the completed desktop image to the client device at the determined transmit data rate for display on the remote desktop.

2. The method of claim 1, wherein
    the selecting includes selecting the encoded video stream among the multiple encoded video streams having a greatest encoding rate that is less than or equal to the determined transmit data rate.

3. The method of claim 2, wherein:
    using the downloaded graphic media includes:
        decoding the transcoded video stream at the edge server to recover the video stream; and
        merging the video stream into the incomplete area; and
    the transmitting includes transmitting the completed desktop image including the merged video stream to the client device.

4. The method of claim 2, wherein:
    using the downloaded graphic media includes merging the transcoded video stream into the incomplete area; and
    transmitting includes transmitting the completed desktop image including the merged transcoded video stream to the client device.

5. The method of claim 1, wherein
    the transcoding includes transcoding the downloaded encoded video stream from a first encoding rate to a second encoding rate that is less than or equal to the determined transmit data rate if the first encoding rate is greater than the determined transmit data rate.

6. The method of claim 1, wherein the determining communication link conditions includes determining a communication bandwidth available to transmit data from the edge server to the client device based on one or more of (i) an available communication bandwidth in the local network, and (ii) a signal-to-noise ratio (SNR) indicative of a quality of one or more communication links in the local network over which data is transmitted from the edge server to the client device.

7. The method of claim 6, wherein the determining communication link conditions includes collecting information indicative of the communication link conditions from an access point in the local network to which the edge server and the client device are connected.

8. The method of claim 6, wherein determining the transmit data rate includes determining a maximum data rate that is supported by the determined communication bandwidth.

9. The method of claim 1, further comprising:
    at the edge server, receiving a request for the graphic media from the desktop server over a wide area network, wherein the request was previously sent from the client device to the desktop server, and wherein:
        receiving the desktop image includes receiving the desktop image from the virtual desktop server over the wide area network; and
        downloading the graphic media includes downloading the graphic media from the content server over the wide area network.

10. An apparatus comprising:
    a network interface unit in an edge server configured to communicate with a client device in a local network, the client device configured to execute a remote desktop application to display a desktop image representative of a virtual desktop hosted by a virtual desktop server; and
    a processor of the edge server coupled to the network interface unit, and configured to:
        receive from the virtual desktop server the desktop image to be processed for display by the remote desktop application, the desktop image including an incomplete area in which graphic media is to be displayed, wherein the graphic media includes video accessible from a content server as multiple encoded video streams each encoded at a distinct encoding rate;

determine communication link conditions in the local network;

determine a transmit data rate for transmitting data to the client device over the local network based on the determined link conditions;

select, at the edge server, an encoded video stream among the multiple encoded video streams based on the distinct encoding rates and the determined transmit data rate;

download the selected encoded video stream of the graphic media from the content server;

transcode the downloaded encoded video stream to a different encoding rate;

use the transcoded video stream of the graphic media to complete the incomplete area to produce a completed desktop image; and cause the network interface to transmit the completed desktop image to the client device at the determined transmit data rate for display on the remote desktop.

11. The apparatus of claim 10, wherein the processor is further configured to select the encoded video stream among the multiple encoded video streams having a greatest encoding rate that is less than or equal to the determined transmit data rate.

12. The apparatus of claim 11, wherein:

the processor is configured to use the downloaded graphic media by:

decoding the transcoded video stream at the edge server to recover the video stream; and merging the video stream into the incomplete area; and the processor is configured to cause the network interface to transmit by causing the network interface to transmit the completed desktop image including the merged video stream to the client device.

13. The apparatus of claim 11, wherein the processor is configured to:

use the graphic media by merging the transcoded video stream into the incomplete area; and transmit the completed desktop image including the merged transcoded video stream to the client device.

14. The apparatus of claim 10, wherein the processor is configured to transcode the downloaded encoded video stream from a first encoding rate to a second encoding rate that is less than or equal to the determined transmit data rate if the first encoding rate is greater than the determined transmit data rate.

15. The apparatus of claim 10, wherein the processor is configured to determine communication link conditions by determining a communication bandwidth available to transmit data from the edge server to the client device based on one or more of (i) an available communication bandwidth in the local network, and (ii) a signal-to-noise ratio (SNR) indicative of a quality of one or more communication links in the local network over which data is transmitted from the edge server to the client device.

16. The apparatus of claim 15, wherein the processor is configured to determine the transmit data rate by determining a maximum data rate that is supported by the determined communication bandwidth.

17. A non-transitory processor readable medium storing instructions that, when executed by a processor, cause the processor to:

at an edge server configured to communicate with a client device in a local network, the client device configured to execute a remote desktop application to display a desktop image representative of a virtual desktop hosted by a virtual desktop server:

receive from the virtual desktop server the desktop image to be processed for display by the remote desktop application, the desktop image including an incomplete area in which graphic media is to be displayed, wherein the graphic media includes video accessible from a content server as multiple encoded video streams each encoded at a distinct encoding rate;

determine communication link conditions in the local network;

determine a transmit data rate for transmitting data to the client device over the local network based on the determined link conditions;

select, at the edge server, an encoded video stream among the multiple encoded video streams based on the distinct encoding rates and the determined transmit data rate;

download the selected encoded video stream of the graphic media from the content server;

transcode the downloaded encoded video stream to a different encoding rate;

use the transcoded video stream of the graphic media to complete the incomplete area to produce a completed desktop image; and transmit the completed desktop image to the client device at the determined transmit data rate for display on the remote desktop.

18. The processor readable medium of claim 17, wherein the instructions further comprise instructions operable to cause the processor to select the encoded video stream among the multiple encoded video streams having a greatest encoding rate that is less than or equal to the determined transmit data rate.

19. The processor readable medium of claim 18, wherein the instructions operable to cause the processor to use the downloaded graphic media include instructions to cause the processor to:

decode the transcoded video stream at the edge server to recover the video stream; and merge the video stream into the incomplete area; and the instructions operable to cause the processor to transmit include instructions to cause the processor to transmit the completed desktop image including the merged video stream to the client device.

20. The processor readable medium of claim 18, wherein the instructions operable to cause the processor to use the downloaded graphic media include instructions to operable cause the processor to merge the transcoded video stream into the incomplete area; and wherein the instructions operable to cause the processor to transmit include instructions operable to cause the processor to transmit the completed desktop image including the merged transcoded video stream to the client device.

21. The processor readable medium of claim 17, wherein the instructions operable to cause the processor to transcode include instructions to cause the processor to transcode the downloaded encoded video stream from the first encoding rate to a second encoding rate that is less than or equal to the determined transmit data rate if the first encoding rate is greater than the determined transmit data rate.

22. The processor readable medium of claim 17, wherein the instructions operable to cause the processor to determine communication link conditions include instructions operable to cause the processor to determine a communication bandwidth available to transmit data from the edge server to the client device based on one or more of (i) an available communication bandwidth in the local network, and (ii) a signal-to-noise ratio (SNR) indicative of a quality of one or more communication links in the local network over which data is transmitted from the edge server to the client device.

23. The processor readable medium of claim 22, wherein the instructions operable to cause the processor to determine the transmit data rate include instructions operable to cause the processor to determine a maximum data rate that is supported by the determined communication bandwidth.

* * * * *